Feb. 13, 1945.　　　T. L. STALKER　　　2,369,321
CHUCK FOR SMALL DRILLS
Filed May 19, 1943
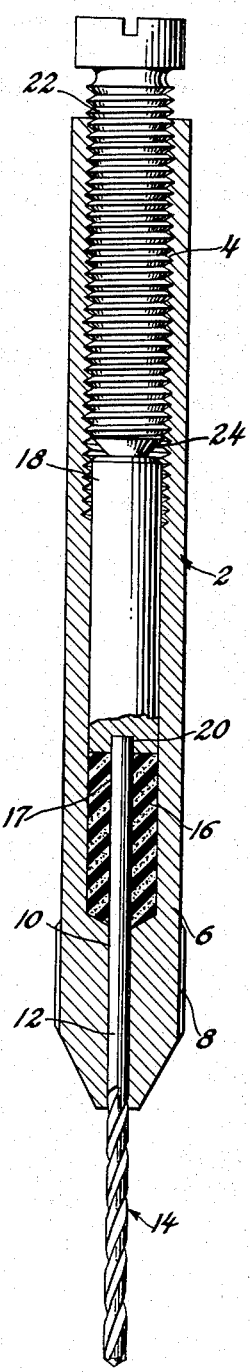
Inventor
Tracy L. Stalker
By Blackmor, Spencer & Flint
Attorneys Patented Feb. 13, 1945

2,369,321

UNITED STATES PATENT OFFICE 2,369,321

CHUCK FOR SMALL DRILLS

Tracy L. Stalker, Flint, Mich., assignor to General Motors Corporation, Detroit, Mich., a corporation of Delaware Application May 19, 1943, Serial No. 487,553

4 Claims. (Cl. 279—102)

This invention relates to chucks and has particular reference to a chuck for holding small drills.

Because of the increased use of drills in war work, particularly in making airplane engine parts, it has been found necessary to use a large number of extremely small drills to drill small openings (.040 inch) and the breakage of these drills has been exceptionally large.

With a view to decreasing the drill breakage and increasing production, there was designed the small drill chuck disclosed in the present application. The essential feature of the chuck is the application of an insert of a yieldable material, preferably rubber, which can be compressed and tightly grip the exterior of the shank of the drill to hold it while it is operating on the work. The rubber will allow a certain amount of yield which has been found in practice to decrease breakage. There is also the additional advantage that when a tool is broken it is very easy to replace.

On the drawing the single figure shows an enlarged sectional view through the chuck and showing the drill in place.

Referring to the drawing, the numeral 2 indicates the metallic chuck body (about ¼″ in diameter) which in general is hollow and is provided with an interior screw threaded part 4 at its upper end. Its lower end has a part 6 which is more or less solid and which may be exteriorly knurled as at 8. This solid part has a central bore or opening 10 through which there can slidably pass the shank 12 of a No. 60 drill indicated as a whole at 14. The bore 10 forms a support for the shank of the drill. The shank 12 extends through the solid part 6 and into the hollow part of the body 2.

Inside the body part 2 and at the place where the end of the shank 12 passes into the hollow of the body there is positioned an insert or bushing 16 made of a yieldable material, preferably rubber. The insert 16 has a central bore 17 through which the shank 12 passes. Over the rubber 16 there is positioned a metal plunger 18 slidably mounted in the body 2. This plunger 18 is provided with a recess 20 at its bottom end snugly but freely to receive the end of the shank 12.

The threaded end 4 of the body has a screw 22 threaded therein, and the end 24 of this screw abuts the upper end of the plunger 18.

It will be apparent from the drawing that when the screw 22 is turned inward to force the plunger 18 downward, the rubber insert 16 will be compressed and cause the rubber tightly to grip the end of the shank 12 of the drill 14. The tight grip between the rubber and the shank end will enable the drill press to drive the drill and operate on the work.

In case too great a resistance is normally encountered by the drill 14, the rubber 16 will allow a certain amount of yield and enable the drill to work through the hard spot. This will avoid a breakage of the drill.

In applying the drill 14 to the chuck, the drill is first passed through the bore 10 and then through the opening 17 in the rubber 16 and its end caused to be received in the recess 20 in the bottom of the plunger 18. The end of the shank must be in the recess 20 before the screw 22 is tightened. If the rubber is allowed to enter between the shank end and the plunger, the pressure in the rubber will slowly force the drill outward. The screw 22 is now turned inwardly to force the plunger down which will compress the rubber 16 and at the same time force the drill 14 axially outwardly until the desired compression has been reached in the rubber.

The chuck may be held in the drill press in any suitable way, the details of which form no part of the invention.

In turning the screw 22 inwardly, the knurled part 8 serves as a convenient means for the operator to hold the chuck while tightening the screw 22.

I claim:

1. In a chuck for holding a drill, a generally hollow body having a bore in its end to enable the drill to be inserted in the body part, said bore forming a support for the shank of the drill, an insert of yieldable material in the hollow body part adjacent the end thereof and above the bore, said insert having a through opening to enable the shank of the drill to pass therethrough, a plunger in the body part to contact directly with the end of the drill, and means to move the plunger toward the drill to compress the yieldable material around the drill and enable the yieldable material to hold the drill when operating on the work.

2. In a chuck for holding a drill, a generally hollow body having a bore in its end to enable the drill to be inserted in the body part, said bore forming a support for the shank of the drill, a rubber insert in the hollow body part adjacent the end thereof and above the bore, said rubber insert having a through opening to enable the shank of the drill to pass therethrough, a plunger in the body part to contact directly with the end of the drill, and means to move the plunger toward the drill to compress the rubber around the drill and enable the rubber to hold the drill when operating on the work.

3. In a chuck for holding a drill, a generally hollow body having a bore in its end to enable the drill to be inserted in the body part, said bore forming a support for the shank of the drill, a rubber insert in the hollow body part adjacent the end thereof and above the bore, said rubber insert having an opening to enable the shank of the drill to pass therethrough, a plunger in the body part, a recess in the end of the plunger to receive the drill and having a bottom to contact the end of the drill thereby preventing the rubber from crowding over the end of the drill, and means to move the plunger toward the drill to compress the rubber around the drill and enable the rubber to hold the drill when operating on the work.

4. In a chuck for holding a drill, a generally hollow body having a bore in its end to enable the drill to be inserted in the body part, said bore forming a support for the shank of the drill to enable the drill to be inserted in the hollow body part, a rubber insert in the body part adjacent the end thereof and above the bore, said rubber insert having an opening to enable the shank of the drill to pass therethrough, a plunger in the body part, a recess in the end of the plunger to receive the drill and having a bottom to contact the end of the drill thereby preventing the rubber from crowding over the end of the drill, a screw threaded in the end of the body and adapted to operate on the plunger to move it toward the drill to compress the rubber around the drill and enable the rubber to hold the drill when operating on the work.

TRACY L. STALKER.